United States Patent [19]
Hsiao

[11] Patent Number: 5,632,056
[45] Date of Patent: May 27, 1997

[54] BICYCLE TOOL ASSEMBLY

[76] Inventor: Chia-Yuan Hsiao, No. 4, Lane 11, Tze-Chiang St., Tu-Cheng City, Taipei Hsien, Taiwan

[21] Appl. No.: 617,087

[22] Filed: Mar. 18, 1996

[51] Int. Cl.⁶ ............................................. B25B 13/00
[52] U.S. Cl. ................. 7/138; 7/166; 7/100; 157/1.3; 81/437
[58] Field of Search .......................... 7/100, 138, 166, 7/169; 81/437; 157/1.3

[56] References Cited

U.S. PATENT DOCUMENTS

| | | | |
|---|---|---|---|
| 2,453,901 | 11/1948 | Gonsett et al. | 7/138 |
| 3,370,307 | 2/1968 | Beeks | 7/135 |
| 5,086,674 | 2/1992 | Her | 7/138 X |
| 5,099,726 | 3/1992 | Hsiao | 81/437 X |
| 5,259,281 | 11/1993 | Burke | 81/437 |
| 5,285,543 | 2/1994 | Rowe | 7/138 |

*Primary Examiner*—James G. Smith
*Attorney, Agent, or Firm*—Morton J. Rosenberg; David I. Klein

[57] ABSTRACT

A bicycle tool assembly which includes a hollow handle, a coupling block fastened to one end of the handle by a tongue-and-groove joint to hold a driving element, for example, an open-end spanner, a box-end spanner, a hexagonal wrench, a cabinet tip, a Phillips head tip, or a hexagonal head tip, and a tire repair tool slidably mounted in an opposite end of the hollow handle, the tire repair tool having a front hook for pulling a bicycle tire out of the rim, a tire pressure releasing pin in the middle for fastening to the valve of the bicycle tire to release the pressure of the inner tube, and a coupling tail engaged with a tapered hole in the hollow handle to hold the tire repair tool in the operative position.

7 Claims, 4 Drawing Sheets

BICYCLE TOOL ASSEMBLY

BACKGROUND OF THE INVENTION

The present invention relates to a bicycle tool assembly which includes a handle, a tire repair tool fastened to the handle at one end for removing the bicycle tire from the rim, and any of a set of driving elements fastened to the handle at an opposite end for turning the screws and nuts of the bicycle.

A bicycle uses a big number of parts and accessories. For repairing the parts and accessories of a bicycle or removing them from the bicycle, a variety of tools may be used. However, it is not convenient to carry a variety of tools with the bicycle. Because few people prepare a full set of bicycle tools when riding a bicycle, few bicycle owners can repair the bicycle by oneself If any part of the bicycle is damaged or out of order.

SUMMARY OF THE INVENTION

The present invention has been accomplished to provide a bicycle tool assembly which can be used for removing different parts and accessories from the bicycle for repair. According to the present invention, the bicycle tool assembly includes a hollow handle, a coupling block fastened to one end of the handle by a tongue-and-groove joint to hold a driving element, for example, an open-end spanner, a box-end spanner, a hexagonal wrench, a cabinet tip, a Phillips head tip, or a hexagonal head tip, and a tire repair tool slidably mounted in an opposite end of the hollow handle, the tire repair tool having a front hook for pulling a bicycle tire out of the rim, a tire pressure releasing pin in the middle for fastening to the valve of the bicycle tire to release the pressure of the inner tube, and a coupling tail engaged with a tapered hole in the hollow handle to hold the tire repair tool in the operative position.

DETAILED DESCRIPTION OF THE PREFERRED EMBODIMENT

Figure 1:
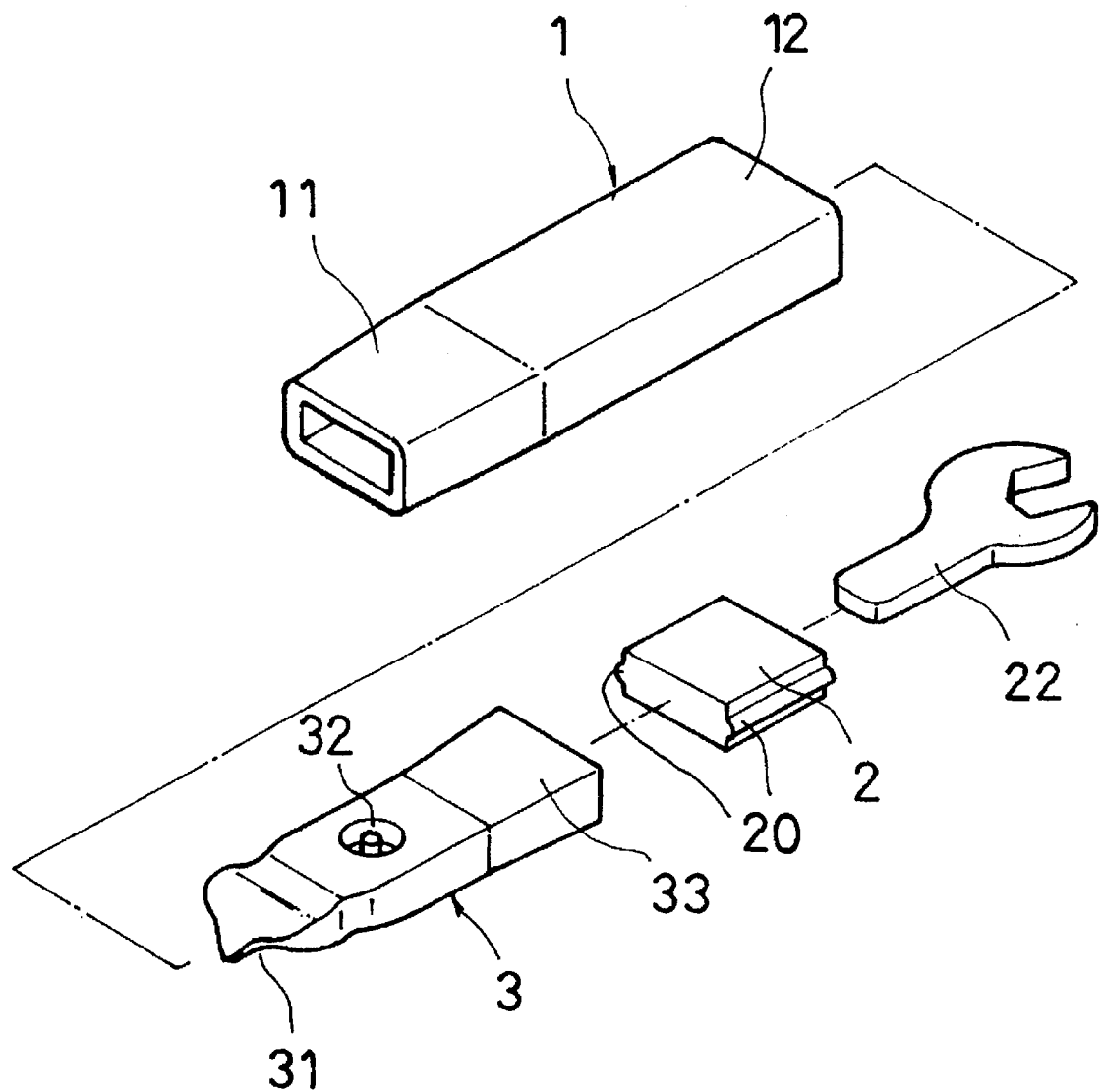
FIG. 1 is an exploded view of a bicycle tool assembly according to the present invention.
Figure 2:
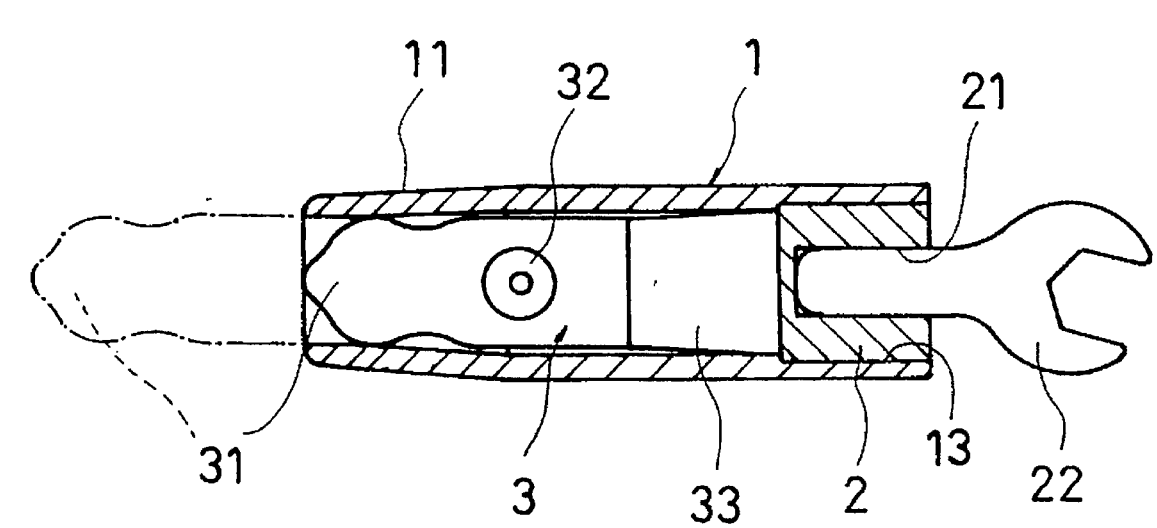
FIG. 2 is a sectional assembly view of the bicycle tool assembly shown in FIG. 1.
Figure 3:
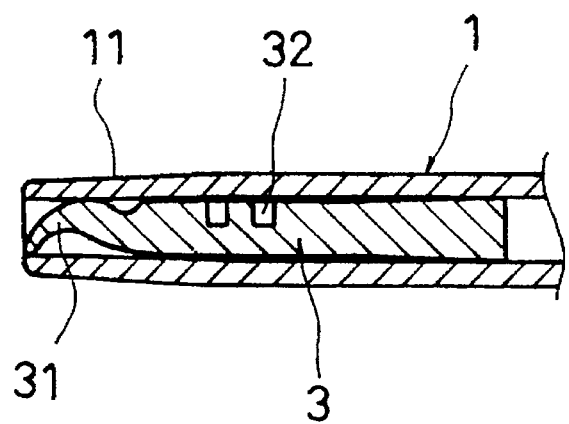
FIG. 3 is a sectional view showing the tire repair tool received inside the hollow handle.
Figure 4:
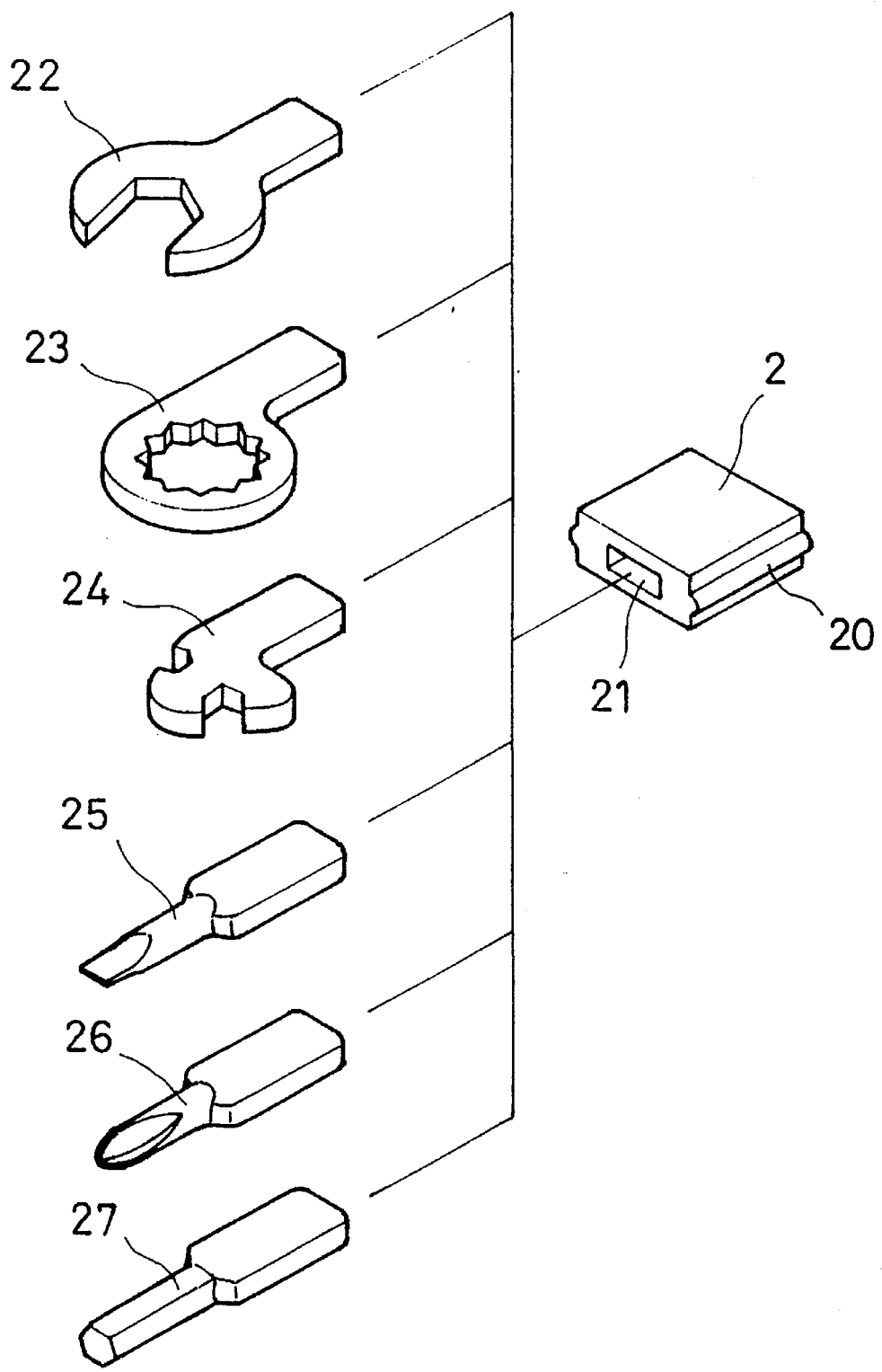
FIG. 4 shows a set of different driving elements according to the present invention.

Referring to FIGS. 1, 2, 3, and 4, the handle, referenced by 1, is an elongated, hollow member having two opposite longitudinal grooves 13 on the inside of one end thereof, namely, the first end 12. The opposite end, namely, the second end 11 of the handle 1 is tapered. A coupling block 2 is provided having two longitudinal tongues 20 at two opposite sides, and a coupling hole 21 at one end for holding a driving element, for example, an open-end spanner 22, a box-end spanner 23, a hexagonal wrench 24, a cabinet tip 25, a Phillips head tip 26, or a hexagonal head tip 27 (see FIG. 4). By fitting the longitudinal tongues 20 into the longitudinal grooves 13, the coupling block 2 is fastened to the first end 12 of the handle 1. A tire repair tool 3 is slidably mounted in the second end 11 of the handle 1. The tire repair tool 3 comprises a front hook 31 for pulling the tire out of the rim, a tire pressure releasing pin 32 in the middle for fastening to the valve of the tire to release its pressure, and a coupling tail 33. When the the tire repair tool 3 is pulled out of the second end 11 of the handle 1, the coupling tail 33 is forced into engagement with the tapered inside space of the second end 11 of the handle 1, and therefore the tire repair tool 3 is retained to the handle 1 in the operative position.

Figure 5:
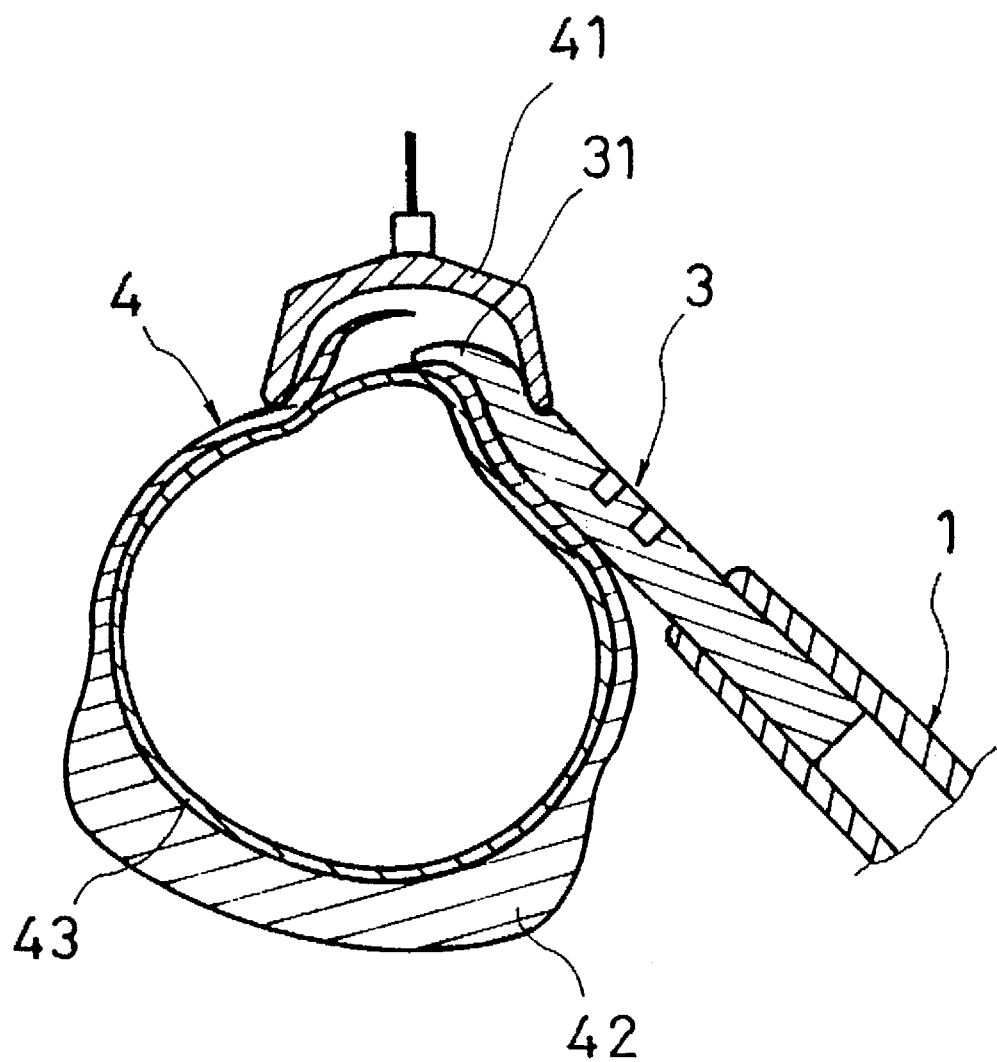
FIG. 5 is an applied view of the present invention, showing the front hook of the tire repair tool inserted in between the cover of the tire and the rim.

Referring to FIG. 5, when the tire repair tool 3 is extended out of the handle 1, the front hook 31 can be inserted in between the rim 41 and the bicycle tire 4 to remove the cover 42 and the inner tube 43 out of the rim 41. When the cover 42 is removed from the rim 41, the tire pressure releasing pin 32 can be operated to release the pressure of the inner tube 43.

It is to be understood that the drawings are designed for purposes of illustration only, and are not intended as a definition or limits of the invention disclosed.

What the invention claimed is:

1. A bicycle tool assembly comprising:

a hollow handle having a first end and a second end, said first end having two longitudinal grooves, said second end defining a tapered hole gradually reducing from said first end toward the outside;

a coupling block fastened to the first end of said hollow handle, said coupling block having two longitudinal tongues at two opposite sides respectively fitted into the longitudinal grooves of the first end of said hollow handle, and a coupling hole at an outer end;

a driving element fastened to the coupling hole of said coupling block and driven by said hollow handle to turn bicycle accessories; and a tire repair tool slidably mounted in the second end of said hollow handle, said tire repair tool comprising a front hook for pulling a bicycle tire out of the rim, a tire pressure releasing pin in the middle for fastening to the valve of the bicycle tire to release the pressure of the inner tube, and a coupling tail engaged with the tapered hole of the second end of said hollow handle to hold said tire repair tool in the operative position.

2. The bicycle tool assembly of claim 1 wherein said driving element is an open-end spanner.

3. The bicycle tool assembly of claim 1 wherein said driving element is a box-end spanner.

4. The bicycle tool assembly of claim 1 wherein said driving element is a hexagonal wrench.

5. The bicycle tool assembly of claim 1 wherein said driving element is a cabinet tip.

6. The bicycle tool assembly of claim 1 wherein said driving element is a Phillips head tip.

7. The bicycle tool assembly of claim 1 wherein said driving element is a hexagonal head tip.

* * * * *